No. 888,524. PATENTED MAY 26, 1908.
J. MURR.
WHEEL SCRAPER FOR GRAIN DRILLS OR OTHER VEHICLES.
APPLICATION FILED JUNE 20, 1907.

Witnesses
Inventor
John Murr
by H. B. Willson & Co.
Attorneys

UNITED STATES PATENT OFFICE.

JOHN MURR, OF CELINA, OHIO.

WHEEL-SCRAPER FOR GRAIN-DRILLS OR OTHER VEHICLES.

No. 888,524.  Specification of Letters Patent.  Patented May 26, 1908.

Application filed June 20, 1907. Serial No. 379,949.

*To all whom it may concern:*

Be it known that I, JOHN MURR, a citizen of the United States, residing at Celina, in the county of Mercer and State of Ohio, have invented certain new and useful Improvements in Wheel-Scrapers for Grain-Drills or other Vehicles; and I do declare the following to be a full, clear, and exact description of the invention, such as will enable others skilled in the art to which it appertains to make and use the same.

This invention has relation to new and useful improvements in wheel scrapers for grain drills or other vehicles, and has for its object the production of simple and economical means of this character adapted for attachment to a vehicle to scrape or clean off any dirt or other matter that may have accumulated on the wheels thereof.

In the operation of a grain drill where the ground is not fairly dry, the dirt gathers on the wheels, which not only renders the drill much heavier and harder to pull, but increases the diameters of the wheels and causes the drill to operate or register the number of acres of grain sown with more or less accuracy; and my invention is especially designed for attachment to a grain drill to keep the wheels thereof free at all times from dirt or other matter, and thereby cause the drill to operate with absolute accuracy.

With the foregoing and other objects in view, the invention consists of certain novel features of construction, combination and arrangement of parts, as will be more fully described and particularly pointed out in the appended claims.

Figure 1:
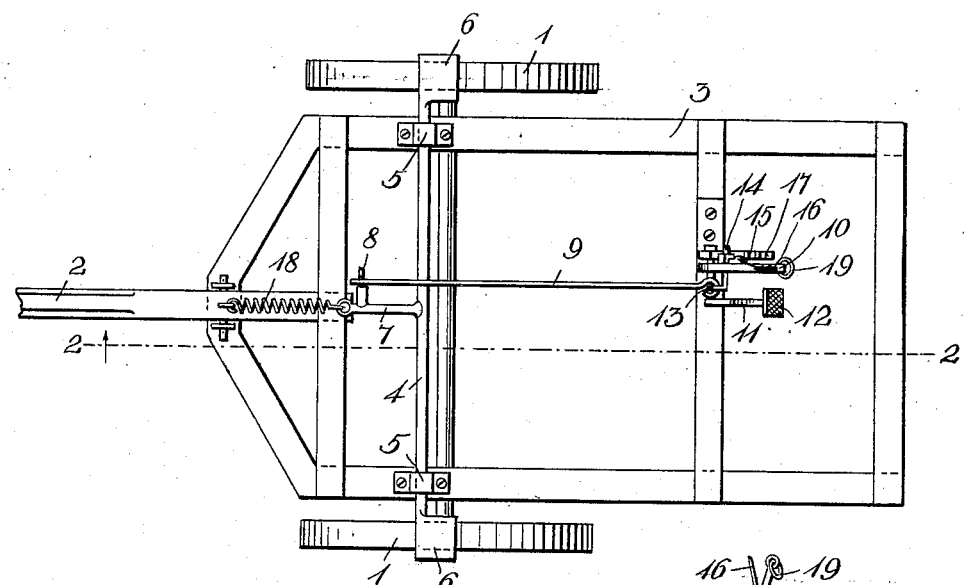
Figure 2:
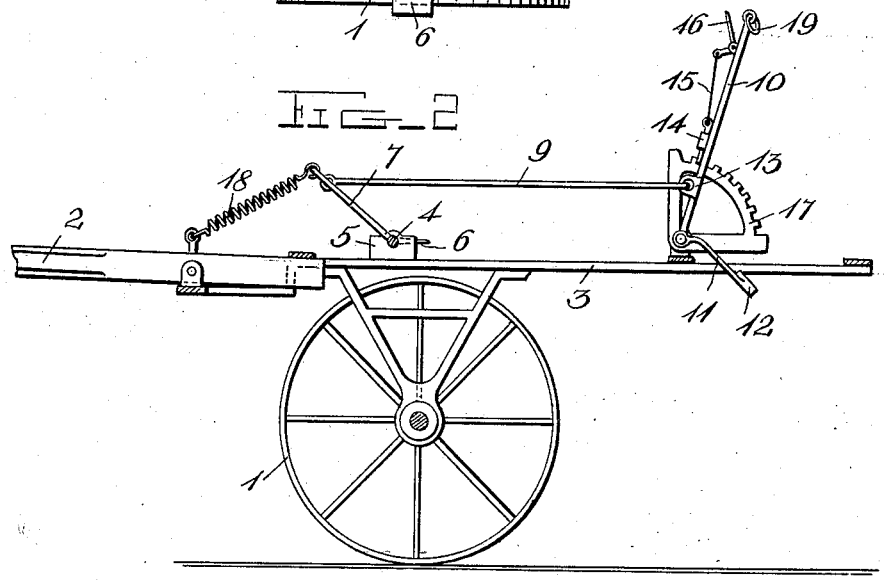

In the accompanying drawings,—Figure 1 is a plan view of my invention attached in position to so much of a grain drill as is necessary to illustrate the invention; Fig. 2 is a central longitudinal section on the line 2—2 of Fig. 1, looking in the direction indicated by the arrows.

Referring to the drawings for a more particular description of the invention, 1 indicates the wheels, 2 the tongue, and 3 the frame of a grain drill.

In carrying out the invention, a transversely disposed rock shaft or rod 4 is arranged forwardly of the wheels 1 and is journaled by suitable bearings 5 to the frame 3. The ends of said rock shaft or rod are preferably flattened longitudinally to form scraper knives or blades 6, for scraping off any dirt or other matter that may have accumulated on the wheels, and each of said bearings is preferably made of two sections to enable the ends of the rock shaft or rod to be fitted therein. Said rock shaft or rod is provided at a suitable point, preferably a slight distance laterally of the tongue 2, with an upright arm 7, having an outwardly extending projection 8 at its upper or free end, to which is attached the free end of a longitudinally disposed operating rod or bar 9.

A bell crank lever comprising an upright arm 10 and a rearwardly extending shorter arm 11 having a foot plate 12, at its free end, is pivoted to the rear of the frame, substantially in longitudinal alinement with said upright arm 7 in any suitable manner. The upright arm 7 of said lever is provided near its lower end with an obliquely extending projection 13, to which is attached the free or rear end of said longitudinally disposed operating bar or rod 9. The vertically disposed arm 10 of said bell crank lever is also provided with a spring pawl, connecting rod, and hand grip, 14, 15, and 16, respectively, and said pawl is adapted to engage in either of the teeth or notches of a segmental rack 17, arranged longitudinally of the drill near said lever. A longitudinally disposed coiled spring 18 is attached at one end to the outer or free end of said arm 7, and at its front or opposite end to the tongue 2 for maintaining a pull on the upper end of said arm 7 to normally hold the scraper blades or knives 6 out of engagement with the drill wheels.

In the operation of the invention, the scraper blades or knives may be turned in engagement with the drill wheels either by pushing downwardly on the foot plate 12 or pulling on the upper end of the vertically disposed arm of said bell crank lever, and thereby rocking said rock shaft or rod 4 in its bearings.

To permit the coiled spring 18 to act to throw the scraper blades or knives 6 out of engagement with the drill wheels when the bell crank lever is released, a ring 19 is provided at the upper end of the vertically disposed arm 10 of said lever and is slipped over the upper end of the hand grip 16 to hold the spring pawl 14 out of engagement with the teeth of the segmental rack 17. Should it be desired to hold said scraper blades or knives in permanent engagement with the drill wheels, the ring 19 is disengaged from the hand grip to allow the spring pawl to engage the rack teeth.

While I have shown and described my invention in connection with a grain drill, it may be applied to all vehicles where an accumulation of dirt or other matter on the wheels of the same is objectionable.

It is thought that from the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention.

Having thus described my invention, what I claim as new and desire to secure by Letters-Patent, is:—

The combination with a vehicle having supporting wheels and a frame, the latter being mounted to lie in a plane above the former, of a straight transversely disposed rock shaft mounted on the front end of the frame, said shaft having a forwardly and upwardly extending arm and its ends flattened longitudinally to form straight rearwardly extending scraper blades with rear sharpened edges adapted to engage the supporting wheels at an angle by shifting the rock shaft arm into rearwardly inclined position, a rearwardly extending coil spring attached at one end to the outer end of the rock shaft arm and at its opposite end to the frame at a point in advance of the rock shaft, and manually operated means sustained by the frame for actuating the rock shaft.

In testimony whereof I have hereunto set my hand in presence of two subscribing witnesses.

JOHN X MURR.
his mark

Attest:
   P. E. KENNEY,
Witnesses:
   P. E. KENNEY,
   JOHN ROUDABAUGH.